United States Patent [19]

Kuhne

[11] Patent Number: 4,613,165
[45] Date of Patent: Sep. 23, 1986

[54] INCREASED TENSILE STRENGTH VARIABLE DIAMETER PROTECTIVE JOINT

[75] Inventor: Karl F. Kuhne, Spring, Tex.

[73] Assignee: Carbide Blast Joints, Inc., Houston, Tex.

[21] Appl. No.: 732,703

[22] Filed: May 10, 1985

[51] Int. Cl.[4] .................................. F16L 55/00
[52] U.S. Cl. ............................ 285/45; 138/147; 166/243
[58] Field of Search .......... 285/45; 138/147, 155; 166/243

[56] References Cited

U.S. PATENT DOCUMENTS

| | | | |
|---|---|---|---|
| 320,683 | 6/1885 | Phillis | 285/45 X |
| 1,880,269 | 10/1932 | Murray | 285/45 X |
| 2,925,097 | 2/1960 | Duesterberg | 138/64 |
| 3,382,930 | 5/1968 | Ribb et al. | 166/242 |
| 4,028,796 | 6/1977 | Bergstrom | 29/416 |
| 4,141,386 | 2/1979 | Bergstrom | 138/147 |
| 4,211,440 | 7/1980 | Bergstrom | 285/45 |
| 4,349,050 | 9/1982 | Bergstrom et al. | 138/147 |

Primary Examiner—Thomas F. Callaghan
Attorney, Agent, or Firm—Arnold, White & Durkee

[57] ABSTRACT

There is provided a protective joint for production tubing having a body portion and an increased diameter portion within a zone to be protected and including a transition ring formation and a plurality of first and second generally cylindrical annular protective rings coaxially locatable with the body portion and the increased diameter portion, respectively. The transition ring formation is located between the first and second protective rings and may include a transition ring, a supporting ring and a compensating ring which are sealingly biased with the protective rings against two retainers by a biasing means to thereby form a protective shield capable of accommodating longitudinal movement of the production tubing relative to the protective joint as well as flexing in the production string.

16 Claims, 7 Drawing Figures

INCREASED TENSILE STRENGTH VARIABLE DIAMETER PROTECTIVE JOINT

BACKGROUND OF THE INVENTION

The invention pertains to protective devices for tubular goods and more particularly to increased tensile strength variable diameter protective joints for use as so called blast joints with oil well production tubing.

In oil and gas wells the flow of gas, oil, fluids or combinations thereof from perforations in an underground pressure source often entrains solids including grains of sand. The resulting flow of gas or oil entrained solids often has a sufficient abrasive or cutting effect to cut holes into metal production tubing.

Through the use of logs and other methods well operators are able to locate the perforations in relation to a production tubing string, particularly since the perforations are generally man made. However, exact location of perforations in relation to the production string may be difficult due to the number of variables involved, including the length and weight of the production string, the configuration of the hole, and conditions downhole, such as temperature.

Through the years a number of so called blade joints have been developed with a view toward protecting production tubing. A number of patents disclose a variety of blast joints for tubulars. For example, Duesterberg, U.S. Pat. No. 2,925,097, discloses a covered tubular member for positioning in a well flow pipe. A tubular member is provided with a covering which is said to protect the tubular member from the cutting action of well fluids. The covering includes a coating of a resilient material which may be arranged on the outer surface of the tubular member in strip form. A sleeve formed of hard, brittle material covers the surface of the tubular member between two collars. The collars are adjacent to each end of the tubular member. The sleeve may be formed by a plurality of tubular members which are said to be in end to end interfitting or overlapping relation. Each of the plurality of tubular members forming the sleeve may be provided with recessed portions for interfitting and overlap. A second layer of resilient material is provided on substantially all of the outer surface of the sleeve to act as a shock absorber to protect the sleeve from breakage or damage as the tubular member and connected pipe sections are lowered into position in the well bore. In order to further protect the sleeve an outer shell of metal may be provided which extends between the collars and is secured to each collar by welding.

Ribb, U.S. Pat. No. 3,382,930, discloses a blast joint employing a ceramic material said to resist the eroding action of a fluid flowing against the joint. As disclosed therein, the blast joint includes a ceramic sleeve made up of a plurality of tubular ceramic members that are slipped on a tubing joint in end to end relationship. The ceramic members are held in position by annular collars of an impact resistant, non-brittle material, such as steel. They are provided with a plurality of set screws which engage the tubing joint and hold the collars and the ceramic members between them against longitudinal movement on the joint. The annular collars are spaced from the ends of the tubing joint. A protector made up of an annular ring is located in a groove on the exterior of the blast joint and encircles it to prevent the blast joint from hanging upon obstructions in the well bore. Means are also provided as a cushion between ceramic members and means for holding the members spaced from the tubing string.

Bergstrom, U.S. Pat. No. 4,349,050, which has a common assignee with this invention, discloses a blast joint for subterranean wells. The blast joint is positioned around a section of production tubing. A plurality of rings are assembled on the section of production tubing in end face-to-face array. These rings fit snugly on the production tubing and are formed of a very hard and abrasive resistant material. The ends of the rings are lap finished and the assembly is maintained on the compression by end collars and wave spring washers. When the blast joint is to extend the distance greater than a single section of tubing, two segments of production tubing are prepared by cutting the pin and box end from respective lengths of the production tubing. The resultant segments are joined in a flush pin and box joint.

Other patents assigned to the same assignee as this invention disclose blast joints comprising a plurality of rings. These include U.S. Pat. No. 4,141,386, entitled Blast Joint; U.S. Pat. No. 4,028,796, entitled Method of Making a Blast Joint; and U.S. Pat. No. 4,211,440, entitled Compensated Blast Joint for Oil Well Production Tubing.

Prior devices suffer from one or more of several difficulties or limitations including difficulties or limitations in handling, shipping, manufacturing, assembly, overall effectiveness, longevity, and reusability. Many of these problems are addressed by one or more of the inventions previously assigned to the same assignee as this invention. However, prior devices still suffer from a limitation in not being able to directly and as effectively protect both the tubular and an increased diameter portion of the tubular such as collars used with external non-upset tubing and upset tubing. Further, prior devices have been unable to provide as effective a protective device covering a plurality of tubulars, such as oil well tubing, without impairing the tensile strength of the tubing string. These and other problems encountered with prior devices as alleviated if not substantially eliminated by the present invention.

SUMMARY OF THE INVENTION

There is provided a protective joint for tubulars, such as oil well production tubing, having a body portion with a first diameter and at least one coupling portion having an increased diameter portion. At least a part of both the first and increased diameter portions are included within a zone to be protected by the protective joint. The protective joint includes a plurality of first and second generally cylindrical annular protective rings such as carbide rings. The first protective rings are coaxially located along the body portion of the tubular. The second protective rings are coaxially located along the increased diameter portion of the upset. The first and second protective rings have flat and parallel faces and are sized and configured to accommodate bending movements along the longitudinal axis of the tubular. For example, the first and second protective rings may have flattened parallel faces, sufficient inside diameters and be engagable with like protective rings along a plane intersecting and normal to the inside longitudinal axis of the tubular to accommodate bending movements along the longitudinal axis of the tubular.

A transition ring formation is also provided. The transition ring formation has first and second flat and parallel faces. The transition ring formation also has an inside diameter and an outside diameter at its first face approximately equal to the inside and outside diameter, respectively, of the first protective rings. The inside diameter and outside diameter of the transition ring formation at its second face is approximately equal to the inside and outside diameter, respectively, of the second protective rings. The exterior surface of the transition ring formation is a generally continuous one extending from the first face to the second face of the transition ring formation. The interior surface of the transition ring formation is configured to provide a space along the connection between the coupling portion and the body portion of the tubular sufficient to accommodate longitudinal movement of the protective joint with respect to the tubular.

There is also provided means for biasing coaxially located along some portion of the tubular for engagement with at least one of the protective rings. The biasing means in conjunction with retainers are configured to bias the first and second protective rings and the transition ring formation and so form a protective shield along the entire zone to be protected. The biasing means may include a plurality of wave springs and spacers.

The transition ring formation may take on a number of configurations. The interior surface of the transition ring formation may be a generally continuous surface. Alternatively, the interior surface of the transition ring formation may be a substantially discontinuous surface. Further, the transition ring formation may include one or more integrally mated units or rings. However, the transition ring formation is preferably made up of a plurality of rings of sufficient length along the axis of the tubular to accommodate bending movements in the tubular while remaining substantially sealingly engaged. The plurality of engagable rings preferably have flat and parallel faces normal to the longitudinal axis of the tubular.

Where the transition ring formation is made up of a number of rings, it may include a transition ring, a supporting ring, such as a weight distributing or impact distributing ring, and a compensating ring. Each of these rings have first and second flat and parallel faces and are coaxially disposed with respect to the interior of the longitudinal axis of the tubular. The transition ring is engagable on its first face with at least one of the first protective rings and has an inside diameter approximately equal to the inside diameter of the first protective rings and an outside diameter varying from the outside diameter of the first protective ring at its first face to an expanded outside diameter at its second face.

The supporting ring has an inside diameter approximately equal to the inside diameter of the transition ring and an outside diameter approximately equal to the expanded outside diameter of the transition ring at the second face of the transition ring. The first face of the supporting ring is engagable with the second face of the transition ring. The compensating ring has an outside diameter approximately equal to the outside diameter of the supporting ring and an expanded inside diameter. The expanded diameter of the compensating ring is sufficient to accommodate the increased diameter of the coupling.

The interior surface of the compensating ring is configured in relation to the exterior surface of the coupling and the body portion to provide sufficient spacing to accommodate longitudinal movement of the protective device with respect to the tubular. The length of the compensating ring may vary from the length of the second protective rings.

The protective rings and the rings making up the transition ring formation are preferably made of carbide or a material having characteristics similar to carbide.

The rings making up the transition ring formation may take on a number of forms within the framework of the present disclosure. For example, the transition ring may be a cone shaped ring having an expanding inside diameter, as for example where the tubular is an integral joint pipe. Additionally, some of the rings may be integrally mated to each other.

There now follows a detailed description of several embodiments of the present invention in conjunction with the foregoing drawings. This detailed description is to be taken by way of illustration rather than limitation.

DETAILED DESCRIPTION

Figure 1:
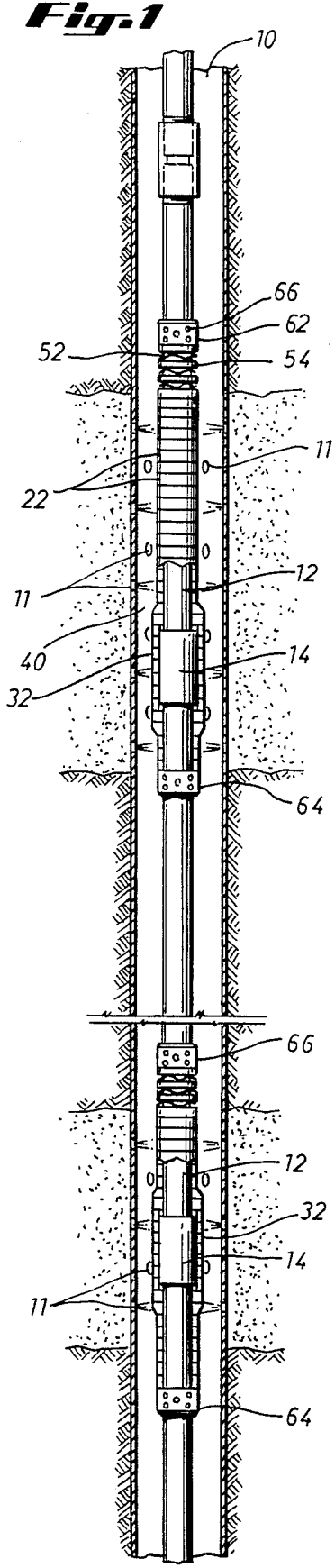
FIG. 1 is a schematic view of one embodiment of the present invention shown in an environment in which it may be used.

FIG. 1 shows a schematic view of one embodiment of the present invention in a well 10 having perforations 11 through which gas or oil entrained particles are escaping and impacting portions of the tubular string made up of tubing joints 12 and couplings 14.

The couplings 14 have increased diameters and are otherwise constructed to provide sufficient tensile strength to support the production string. Although couplings, such as flush joints, having no increase in diameter are sometimes employed, this can be disadvantageous since such couplings generally have only about 50% of the strength of couplings having increased diameters.

As can be seen from FIG. 1, the perforations or openings 11 can be located by either the tubular joint 12 or the coupling 14 or both, thus placing both within a zone to be protected on the tubular string. There is thus a need for an effective device for protecting a tubular assembly having a body portion, such as tubing joint 12, and at least one coupling portion, such as coupling 14, with an increased outside diameter.

Referring generally to FIGS. 1-7, there is provided a protective joint for a tubular assembly having a body portion, such as a tubing joint 12, and at least one coupling portion, such as coupling 14, with an increased outside diameter. Generally, the protective joint includes a plurality of first generally cylindrical annular protective rings, such as tubing body rings 22, and a plurality of second generally cylindrical annular protective rings, such as coupling body rings 32. The tubing body rings 22 are coaxially locatable along the tubing joint 12 while the coupling body rings 32 are coaxially locatable along the coupling 14. The tubing body rings 22 and the coupling body rings 32 have flat and parallel faces normal to the longitudinal axis of the tubular and are sealingly engagable with like rings.

There is further provided a transition ring formation indicated generally at 40. The transition ring formation 40 has two flat and parallel faces which are sealingly engagable with tubing body rings 22 and coupling body rings 32, respectively. The transition ring formation is configured to provide a space, such as space 70, along the connection between the coupling portion, such as coupling 14, and the body portion of the tubular, such as tubing joint 12. The space is sufficient to accommodate relative longitudinal movement of the tubular assembly with respect to the protective device.

Biasing means such as wave springs 52 and spacers 54 are also provided and are engagable at one end with at least one of the protective rings such as tubing body rings 22. At the other end the biasing means is engagable with a retainer such as collar 62. A second retainer, such as another collar 64, is also engagable with protective rings, such as tubing body rings 22. The biasing means is engagable at one end with a retainer and at the other end with at least one of the protective rings to thereby bias the tubing body rings 22, the coupling body rings 32 and the transition ring formation 40 to thereby form a protective shield along a zone of the tubular encompassing varying outside diameters. There is thus provided a protective joint which may effectively protect a selected portion of a tubular assembly having segments of varying outside diameter while still accommodating bending movements along the longitudinal axis of the tubular as well as longitudinal movement of the tubular with respect to the protective joint caused by changes in temperature, movement of the string, the weight of the tubing string and other causes. This in turn facilitates location of the protective joint on a tubing string in relation to any streams of gas or oil entrained particles or the like, such as might come from perforations 11.

The transition ring formation may take on a variety of configurations depending on the application and the type of tubular assembly or connection employed. For example, referring to the embodiment shown in FIGS. 1, 5 and 6, the transition ring formation may preferably include a plurality of rings including a transition ring, such as ring 42, a weight distribution or impact distribution ring such as ring 44 and a compensating ring such as ring 46.

The transition ring 42 has a first face 48 and a second face 50 and is coaxially disposed with respect to the inside longitudinal axis of the tubing joint 12. The first face 48 and the second face 50 of the transition ring 42 as well as the first face 52 and the second face 54 of the weight distribution or impact distribution ring 44 and the first face 56 and the second face 58 of the compensating ring 46 are parallel and flat in a plane substantially normal to the longitudinal axis of the tubular. As the tubing body faces 24 of the tubing body rings 22 and the coupling body faces 34 of the coupling body rings 32 are likewise substantially parallel and flat along a plane normal to the longitudinal axis of the tubing joint 12, the various rings may be sealingly engaged with each other, yet respond to translational forces as might be caused by bending or flexing of a tubing string.

Figure 5:
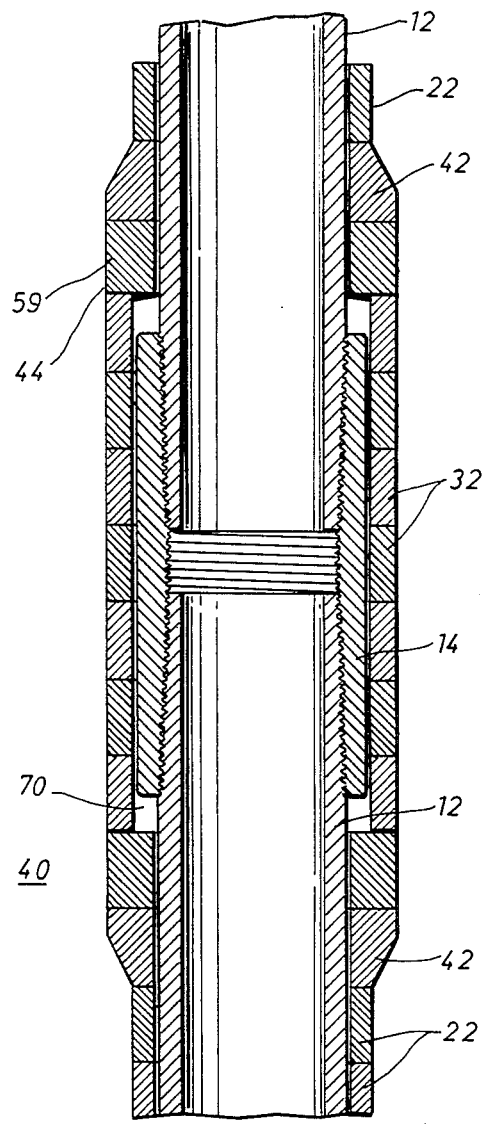
FIG. 5 is a partial cutaway view of a protective joint shown generally in FIG. 1 in conjunction with a non-upset threaded and coupled joint.
Figure 6:
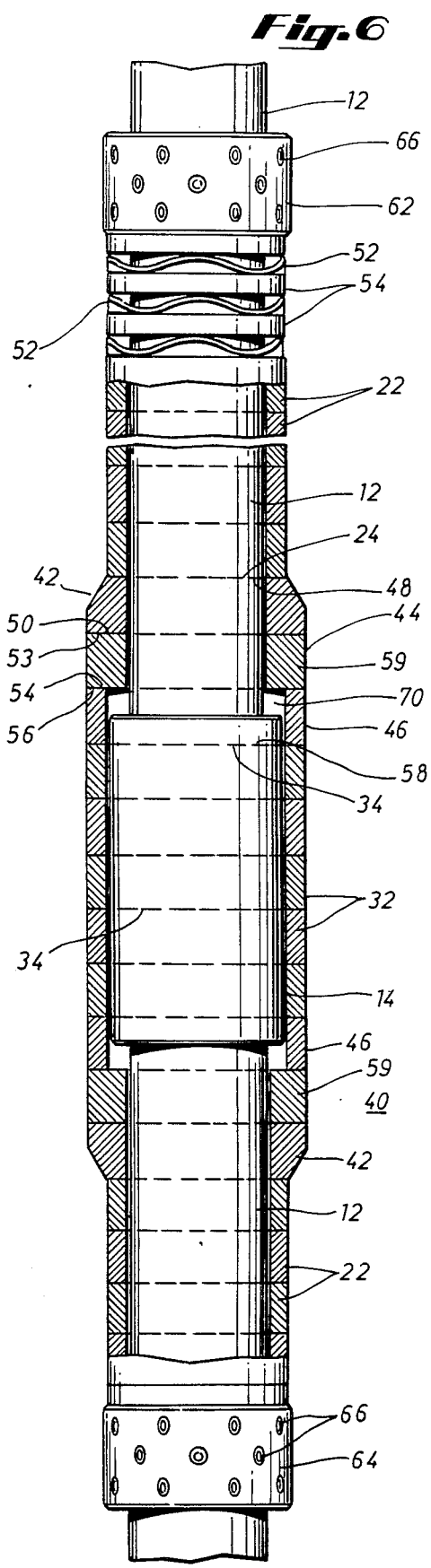
FIG. 6 is a partial schematic view of the protective joint shown in FIG. 5.
Figure 7:
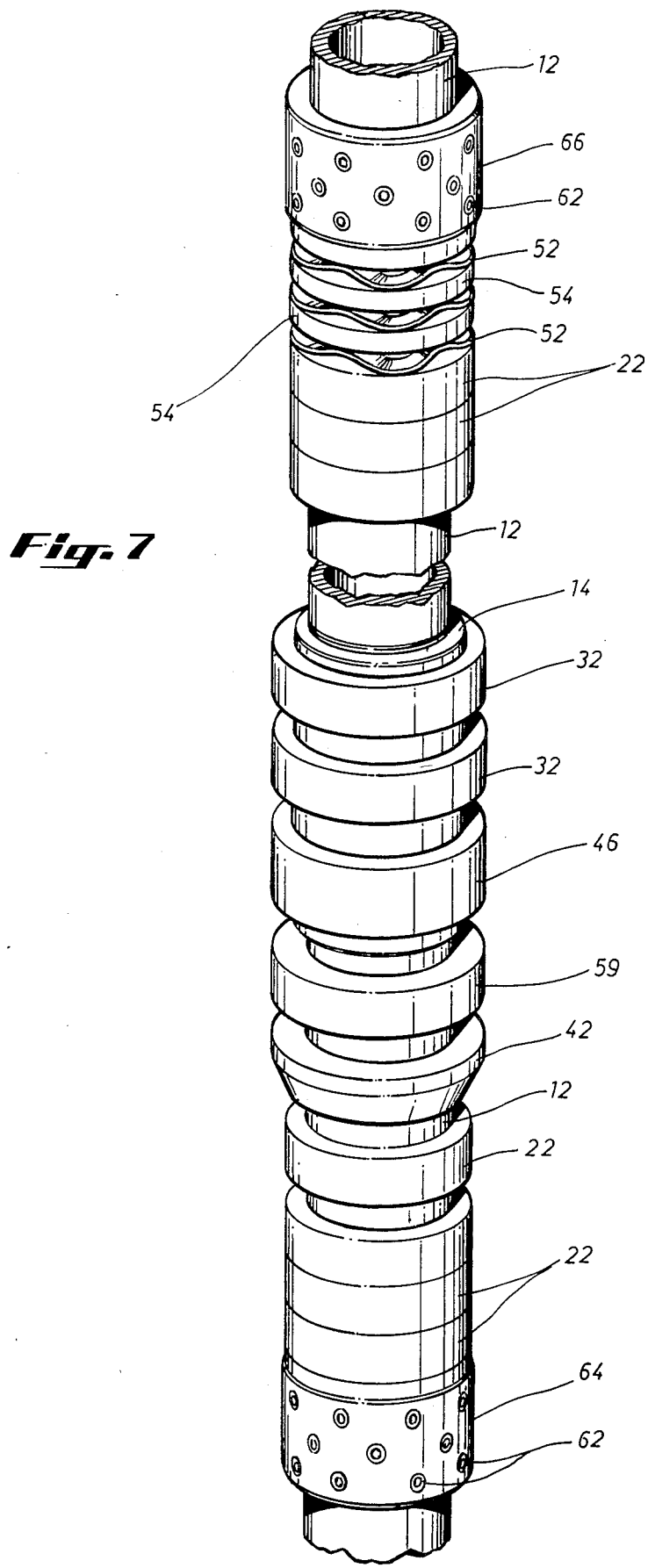
FIG. 7 is a partially exploded view of portions of the protective device shown generally in FIG. 5.

The transition ring 42 has an inside diameter approximately equal to the inside diameter of the tubing body rings 22 and an outside diameter varying from the outside diameter of the tubing ring 22 at the transition ring's first face 48 to an expanded outside diameter at the transition ring's second face 50. The variation in the outside diameter of the transition ring 42 from its first face 48 to its second face 50 preferably results in a smooth and continuous transition. However, as indicated in FIGS. 5 and 6, the complete change in outside diameter may take place prior to the second face 50 of the transition ring 42.

The weight distribution or impact distribution ring 44 is also coaxially located along the tubing joint 12 prior to its juncture with the coupling 14. The weight distribution ring 46 has an outside diameter equal to the increased outside diameter of the transition ring 42 at its second face 50 and an inside diameter equal to that of the transition ring 42. It can thus be seen that the transition ring 42 and the weight distribution ring 46 provide a zone of uniform interior cross section and diameter with an increase in outside diameter along the longitudinal axis of the tubular.

The walls 59 of the weight distribution or impact distribution ring 44 should provide sufficient support to minimize any damage to the transition ring 42 when the tubing joint and coupling are moved in and out of confined areas.

The compensating ring such as ring 46 is only partially coaxially located along the coupling 14. Although the compensating ring 46 has an outside diameter equal to the outside diameter of the coupling body rings 32 and the weight distribution ring 44, it has an inside diameter equal to the inside diameter of the coupling body rings 32 and larger than the inside diameter of the weight disbribution ring 44. This change in inside diameter of the transition ring formation between the inside diameter of the weight distribution ring 44 and the inside diameter of the compensating ring 46 coupled with the overlap of the compensating ring 46 beyond the end of the juncture of the coupling 14 and tubing joint 12 provides a space 70.

The dimensions of the compensating ring 46 are such as to allow the space 70 to accommodate expected longitudinal movement of the coupling 14 in tubing joint 12 with respect to the protective joint when the tubular assembly being protected becomes part of a tubing string. Such longitudinal movements may occur as a result of the weight of the tubing string, changes in temperature or changes in direction of the tubing string at or near the location of the protective joint. By way of example and not by way of limitation, the space 70 formed by the inside wall of the compensating ring 46, a portion of the second face 58 of the compensating ring 46, a portion of the outer surface of the tubing joint 12 and the coupling 14, may have a length along the longitudinal axis of the tubular assembly of at least one-fourth of an inch but preferably of one-half of an inch.

Depending upon the configuration of the transition ring formation and the coupling, if any, the compensating ring, such as ring 46, may simply consist of another coupling body ring 32. However, it is believed important to provide a sufficient space, such as space 70, to accommodate the expected longitudinal movement of the tubular with respect to the protective joint.

Although it is believed that the protective joint can be most easily manufactured and employed with a tubular assembly such as the non-upset threaded and coupled joint shown in FIGS. 1, 5, 6 and 7, it is believed that a protective joint in accordance with the disclosure will also be useful with other tubular assemblies. For example, referring to FIG. 3, there is shown a variation of the protective joint for use with an API external upset coupling. In that embodiment the interior surface of a transition ring 82 increases in diameter from its first face to its second face to accommodate the area of expanded outside diameter caused by the integral upset 16 on the tool joint 18. A weight distribution ring 84 and a compensating ring 86 are similar in configuration to their counterparts in the embodiment shown in FIGS. 5 and 6. A similar space, space 86, is also provided to accommodate relative longitudinal movement.

Figure 4:
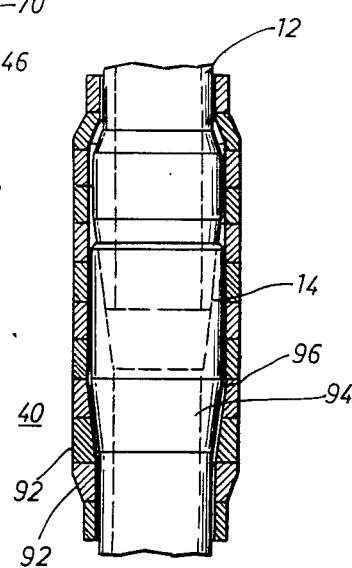
FIG. 4 is a cutaway view of a protective joint in conjunction with an integral joint.

In another embodiment, the transition ring formation may comprise one integral ring or a plurality of integrally mated cone shaped rings. For example, as shown in FIG. 4, the transition ring formation may include a number of cone shaped rings 92 having areas of expanding inside or outside diameter or both to accommodate an API integral joint. A space, space 96, is provided to accommodate relative longitudinal movement.

It is presently believed that if the transition ring formation comprises carbide rings then the rings should preferably be no more than about one to one and one-half inches in length with respect to the longitudinal axis of the tubular assembly. Thus, it is believed that if the transition rings 82 or 92 are approximately more than one inch in length then a plurality of rings should be employed. For example, in FIG. 4 it may be preferable in many cases to use a series of cone shaped rings 92, such as where the length of the upset portion 94 is greater than an inch to two inches. Further, it is believed preferable to maintain a smooth transition along the interior surface of the protective rings, such as is the case with cone shaped rings 92, to avoid binding or directly impacting the upset portion of the tubular assembly such as upset portion 94 of the integral joint shown in FIG. 4.

Figure 2:
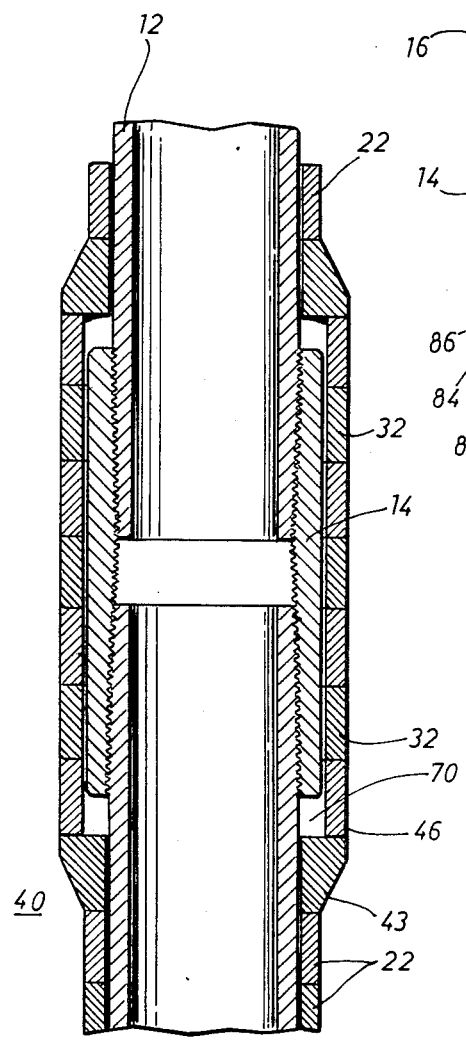
FIG. 2 is a cutaway view of a protective joint shown in conjunction with a non-upset threaded and coupled joint.
Figure 3:
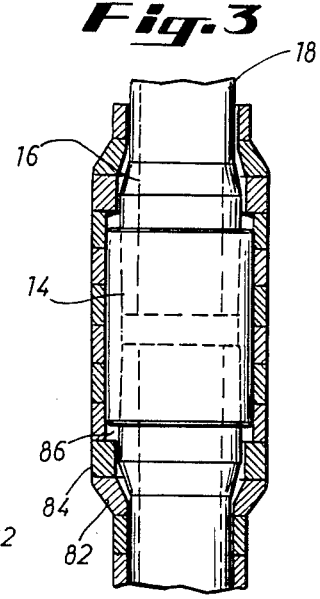
FIG. 3 is a cutaway view of a protective joint in conjunction with an external upset coupling.

Although it is presently believed preferable to employ a weight distribution or impact distribution ring, this may not always be necessary for some applications. For example, as shown in FIG. 2 the first face 48 of the transition ring 43 may abut against and sealingly engage with the first face 56 of the compensating ring 46. This embodiment may be particularly useful where the transition ring is equipped along its length with an additional segment of increased thickness and the tubular assembly will only be subject to relatively minimal stresses downhole.

The protective rings employed are preferably made of carbide or a material having characteristics similar to carbide. More particularly, the rings making up the protective device are preferably made up of cemented tungsten carbide produced in the form of rings which may be placed shoulder-to-shoulder axially in line along the length of the tubular assembly to be protected. The cemented tungsten carbide has provided resistance of great strength and hardness and non-corrodible character which is capable of enduring the impact or blast of liquids or gases bearing entrained sand or other abrasive materials from underground high pressure sources. Although such a material is relatively brittle, subject to internal stresses and frangible, a protective joint in accordance with the disclosure provides effective protection for the tubing joint and should also provide effective protection along zones of increased diameter, particularly where the axial length of any of the rings is limited.

The first and second protective rings, such as tubing body rings 22 and coupling body rings 32, may thus consist of cemented tungsten carbide produced in the form of short cylindrical rings with flat and parallel faces which may be held in shoulder-to-shoulder contact with each other. The transition formation may likewise be made of cemented tungsten carbide. The protective rings thus provide effective protection while being able to accommodate bending movements along the longitudinal axis of the tubular.

As would be known to one skilled in the art having the benefit of this disclosure, the retainers may take on a number of configurations. For example, as shown in the drawings the retainers may comprise collars such as collars 62 and 64. The collars 62 and 64 are of an internal diameter of a size sufficient to fit snugly on the external cylindrical surface of the tubing joint 12. A series of Allen head set screws 66 are seated in threaded holes in the collars 62 and 64 and are designed to grip the tubing joint 12 when the screws are tightened or release the tubing joint 12 when the screws are loosened. Although the collars 62 and 64 are believed to be preferably of an internal diameter less than that of the coupling 14, it may be feasible in some instances to employ collars on a segment of the coupling 14.

The biasing means may also take on any one of a number of configurations as would be known to one skilled in the art having the benefit of this disclosure. However, as shown in the drawings, the biasing means is believed to preferably include a plurality of alternating wave springs 52 and spacers 54. The use of wave springs 52 encircling the tubing joint 12 and disposed between the array of tubing body rings 22 and the collar 62 tends to minimize damage to the protective joint during lowering into a well. More particularly, as discussed in U.S. Pat. No. 4,211,440, a difficulty was encountered where a blast joint comprising a plurality of carbide rings and of considerable length was picked up from the horizontal position by a crane prior to being lowered into the well for attachment to a tubing string. When the protective joint was picked up damage in the form of cracking or fracture of one or more of the tubular body rings 22 would occasionally occur. It is believed that the bending of the tubing string with the rings held against each other by unyielding retainers, such as clamping rings, compressed the rings on the concave side of the string being lifted from the floor tending to chip, crack or break one or more of the rings or the edges thereof. The tubular body rings were sometimes chipped in compression on the concave side because the supporting production is in some degree elastic and with the relatively heavy inelastic rings being held tightly endwise between the end clamping rings and being inflexible, they were subjected to high localized compressive stresses being forced together on the concave side of the bend and tending to be separated from each other on the convex side. While the production tube could stretch and the rings could separate on the convex side to some degree, there is not adequate freedom for shortening of the concave side because the rings occupied the available space and are literally incompressible.

The unbalanced stress of compression is initiated on the upper side of the upper most tubular body rings when the lifting of that end begins during installation of a tubular into a well. By providing the wave springs at that location the sharp bending stresses on the upper end of the string are relieved by the yielding of the adjacent wave spring. The danger of cracking or chipping is thus believed to be greatly reduced or eliminated in conjunction with the protective joint.

The biasing means may also serve to facilitate the handling of stress downhole.

A number of patents assigned to the same assignee as the invention disclosed herein discuss a number of the foregoing matters, such as the use of wave springs, in further detail. These patents include:

| Inventor | Patent No. | Entitled |
|---|---|---|
| Bergstrom, | 4,349,050 | Blast Joint for Subterranean Wells |
| Bergstrom | 4,141,386 | Blast Joint |
| Bergstrom | 4,028,796 | Method of Making the Blast Joint |
| Bergstrom | 4,211,440 | Compensated Blast Joint for Oil Well Production Tubing |

These patents are hereby incorporated by reference.

The following example is provided by way of further illustration rather than limitation.

EXAMPLE

The following example is provided with reference to the embodiment shown generally in FIGS. 1, 5, 6 and 7. Where the tubular assembly includes a non-upset threaded and coupled joint for 2⅜" tubing the following dimensions are generally believed to be preferable:

| Measurement in Inches | |
|---|---|
| Inside diameter of the tubing joint 12 | 1.995[1] |
| Outside diameter of the tubing joint 12 | 2.375 |
| Inside diameter of the coupling 14 | 1.995 |
| Outside diameter of the coupling 14 | 2.875 |
| Inside diameter of the tubing body rings 22 | 2.420 |
| Thickness of the tubing body rings 22 | 0.250 |
| Inside diameter of the coupling body rings 32 | 2.930 |
| Thickness of the coupling body rings 32 | 0.250 |
| Length of collars 62 and 64 | 2.750 |
| Inside diameter of the transition ring 42 | 2.420 |
| Minimum thickness of the transition ring 42 at its first face 48 | 0.250 |
| Maximum thickness of the transition ring 42 at its second face 50 | 0.540 |
| Maximum diameter of the transition ring 42 | 3.500 |
| Outside diameter of the weight distribution or impact distribution ring 44 | 3.500 |
| Inside diameter of the impact distribution ring 44 | 2.420 |
| Inside diameter of compensating ring 46 | 2.930 |
| Wall thickness of compensating ring 46 | 0.250 |
| Length of coupling body rings 32 | 1.000 |
| Length of tubing body rings 22 | 1.000 |
| Length of each of two compensating rings 46 | 1.250 |
| Length of space 70 from the second face 54 of weight distribution ring 44 to the juncture of tubing joint 12 and coupling 14 | 0.500 |
| Difference between outside surface of coupling 14 and inside surface of coupling body rings 32 | 0.0275 |
| Length of coupling 14 | 6.5 |
| Number of coupling body rings 32 | 5 |
| Inside diameter of collar 62 and 64 | 2.420 |
| Number of wave springs 52 | 20[2] |
| Number of spacers 54 | 5[3] |

[1]Normal drift.
[2]Can vary with length of blast joint and temperature.
[3]There are preferably four wave springs for each spacer.

As will be appreciated by one skilled in the art having the benefit of this disclosure a number of modifications may be made to the foregoing apparatus within the spirit of the present invention. For example, the protective joint may be used on a fairly wide range of tubing.

Additionally, the portion of the tubular assembly covered by the protective joint may be varied, though as a result of assembly a three to four foot space is preferably left between an unprotected coupling and a retainer such as collar 62. Further, any two of the rings may be integrally mated to each other either as a forged single piece or by welding. Further, any two of the rings may be integrally mated to each other either as a forged single piece or by welding. For example, the transition ring and the supporting ring may be formed into one integral piece. However, care should be taken in this regard to avoid over extending the length of the rings along the tubular longitudinal axis for the reasons discussed above.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described will be taken as the presently preferred embodiments. Various changes may be made in size, shape and arrangement of parts. For example, equivalent elements or materials may be substituted for those illustrated and described herein, parts may be reversed and certain features of the invention may be utilized independently of the use of other features, all of which would be apparent to one skilled in the art after having the benefit of this disclosure.

What is claimed is:

1. A protective joint for tubulars having a body portion with a first diameter and at least one coupling portion connected to the body portion and having an increased diameter portion, at least a part of both the first and increased diameter portions being included within a zone to be protected by the protective joint, said protective joint comprising:

a plurality of first and second generally cylindrical annular protective rings, said first protective rings being coaxially located along the body portion of the tubular and said second protective rings being coaxially located along the increased diameter portion of the coupling portion, said first and second protective rings having flat and parallel faces, having sufficient inside diameters and being engagable with like protective rings along a plane intersecting the inside longitudinal axis of the tubular to accommodate bending movements along the longitudinal axis of tubular;

at least one transition ring formation having first and second flat and parallel faces, said transition ring formation having an inside diameter and outside diameter at its first face approximately equal to the inside and outside diameter, respectively, of the first protective rings and said transition ring formation having an inside diameter and outside diameter at its second face approximately equal to the inside and outside diameter, respectively, of the second protective rings, the exterior surface of said transition ring formation comprising a generally continuous surface from the first face to the second face of the transition ring formation and the interior surface of said transition ring formation being configured to provide a space along the connection between the coupling portion and the body portion of the tubular sufficient to accommodate longitudinal movement of the protective device with respect to the tubular; and biasing means coaxially located along at least some portion of the tubular, said biasing means being engagable at one end with a retainer locatable on the tubular and at the other end with at least one of the protective rings to bias the first and second protective rings and the transition ring formation to thereby form a protective shield along the entire zone to be protected.

2. A protective joint according to claim 1 wherein the transition ring formation comprises a transition ring having first and second flat and parallel faces, the transition ring having an inside diameter and an outside diameter at its first face approximately equal to the inside and outside diameter, respectively, of the first protective rings and said transition ring having an inside diameter and an outside diameter at its second face approximately equal to the inside and outside diameter, respectively, of a compensating ring, said compensating ring having first and second flat and parallel faces respectively engagable with the second face of the transition ring and a face of one of the second protective rings, the inside and outside diameter, respectively, of the compensating ring being approximately equal to the inside and outside diameter, respectively, of the second protective rings, said compensating ring being configured to accommodate longitudinal movement of the protective joint in relation to the coupling portion.

3. A protective joint according to claim 2 wherein the length of the compensating ring along the longitudinal axis of the tubular differs from the length of the second protective rings along that same axis.

4. A protective joint according to claim 2 wherein the coupling portion comprises an external upset portion integrally attached to the body portion and a collar matable with the external upset portion.

5. A protective joint according to claim 2 wherein the coupling portion comprises the upset portion of external upset tubing.

6. A protective joint according to claim 2 wherein the transition ring comprises at least one cone shaped ring having an expanding inside diameter.

7. A protective joint according to claim 1 wherein the transition ring formation comprises:

at least one transition ring having first and second faces and being coaxially disposed with respect to the inside longitudinal axis of the tubular, said transition ring being engagable on its first face with at least one of the first protective rings and engagable on its second face with at least one supporting ring, said transition ring having an inside diameter approximately equal to the inside diameter of the first protective rings and an outside diameter varying from the outside diameter of the protective ring at the transition ring's first face to an expanded outside diameter at the transition ring's second face; said supporting ring having first and second faces and being coaxially disposed with respect to the inside longitudinal axis of the tubular and along the first outside diameter portion of the tubular, said supporting ring having an inside diameter approximately equal to the inside diameter of the transition ring and an outside diameter approximately equal to the outside diameter of said second protective rings, said first face of the supporting ring being engagable with the second face of the transition ring;

at least one compensating ring having first and second faces and being coaxially disposed within the zone to be protected and along the longitudinal axis of the tubular, said compensating ring having an outside diameter approximately equal to the outside diameter of the supporting ring and an expanded inside diameter, said expanded inside diameter being sufficient to accommodate the increased diameter portion of the upset and, said compensating ring being engagable on its first face with the second face of the supporting ring and on its second face with the first face of a second protective ring.

8. A protective joint according to claim 7 wherein the body portion and coupling portion of the tubular comprise a tool joint and coupling, respectively.

9. A protective joint according to claim 1 wherein the biasing means comprises a plurality of wave springs coaxially located along the longitudinal axis of the body portion of the tubular and a plurality of spacing rings coaxially located along the body portion of the tubular and interspersed between the wave springs.

10. A protective joint according to claim 1 wherein the generally cylindrical annular protective rings and the transition ring formation comprise carbide rings.

11. A protective device according to claim 7 wherein the transition ring and the supporting ring are integrally mated to each other.

12. A protective device according to claim 7 wherein the supporting ring and the compensating ring are integrally mated to each other.

13. A protective joint for a tubular having a body portion with a first outside diameter and at least one coupling portion with an increased outside diameter portion, at least a part of the body portion and the coupling portion being within a zone to be protected, said protective device comprising:

a plurality of first and second generally cylindrical annular protective rings, said first protective rings being coaxially disposed with respect to the inside longitudinal axis of the tubular and along the body portion of the tubular and said second protective rings being coaxially disposed with respect to the inside longitudinal axis of the tubular and along the increased diameter portion of the tubular, said first and second protective rings each having first and second parallel and flat faces substantially normal to the longitudinal axis of the tubular, said faces being engagable with each other along a plane intersecting the inside longitudinal axis of the tubular and said first and second protective rings having sufficient inside diameters to accommodate bending movements along the longitudinal axis of the tubular;

at least one transition ring having first and second faces and being coaxially disposed with respect to the inside longitudinal axis of the tubular, said transition ring being engagable on its first face with at least one of the first protective rings and engagable on its second face with at least one supporting ring, said transition ring having an inside diameter approximately equal to the inside diameter of the first protective rings and an outside diameter varying from the outside diameter of the protective ring at the transition ring's first face to an expanded outside diameter at the transition ring's second face; said supporting ring having first and second faces and being coaxially disposed with respect to the inside longitudinal axis of the tubular and along the first outside diameter portion of the tubular, said supporting ring having an inside diameter approximately equal to the inside diameter of the transition ring and an outside diameter approximately equal to the outside diameter of said second protective rings, said first face of the supporting ring being engagable with the second face of the transition ring;

at least one compensating ring having first and second faces and being coaxially disposed within the zone to be protected and along the longiutdinal axis of the tubular, said compensating ring having an outside diameter approximately equal to the outside diameter of the supporting ring and an expanded inside diameter, said expanded inside diameter being sufficient to accommodate the increased diameter portion of the upset and, said compensating ring being engagable on its first face with the second face of the supporting ring and on its second face with the first face of a second protective ring; and biasing means coaxially locatable along at least some portion of the tubular, said biasing means being engagable at one end with a retainer locatable on the tubular and with at least one of the protective rings to thereby bias the first and second protective rings, the transition ring, the supporting ring and the compensating ring, to thereby form a protective shield along the entire zone to be protected.

14. A protective joint according to claim 13 wherein the generally cylindrical annular protective rings, the transition ring, the compensating ring and the supporting ring comprise carbide.

15. A protective joint according to claim 13 wherein the coupling comprises a collar.

16. A protective joint for a tubular including a non-upset threaded and coupled joint with a coupling of increased diameter said protective joint comprising:

a plurality of first and second generally cylindrical annular carbide rings, said first carbide rings being coaxially disposed with respect to the inside longitudinal axis of the tubular and along the tubing joint, and said second carbide rings being coaxially disposed with respect to the inside longitudinal axis of the tubular and along the coupling, said first and second carbide rings each having first and second parallel and flat faces substantially normal to the longitudinal axis of the tubular, said faces being sealingly engagable with each other along a plane perpendicular to the inside longitudinal axis of the tubular and said first and second carbide rings having sufficient inside diameters to accommodate bending movements along the longitudinal axis of the tubular;

at least one carbide transition ring having first and second flat and parallel faces substantially normal to the longitudinal axis of the tubular and being coaxially disposed with respect to the inside longitudinal axis of the tubular, said transition ring being engagable on its first face with at least one of the first carbide rings and being sealingly engagable on its second face with at least one impact distribution ring, said carbide transition ring having an inside diameter approximately equal to the inside diameter of the first carbide rings and an outside diameter varying from the outside diameter of the carbide ring at the transition ring's first face to an expanded outside diameter at the transition ring's second face, the surface of said carbide transition ring being configured to provide a continuous and smooth transition from the first face to the second face of the transition ring, and said impact distribution ring having first and second faces and being coaxially disposed with respect to the inside longitudinal axis of the tubular and along the tool joint, said impact distribution ring having an inside diameter approximately equal to the inside diameter of the transition ring and an outside diameter approximately equal to the outside diameter of the second carbide rings, said first face of the impact distribution ring being sealingly engagable with the second face of the transition ring;

a third carbide ring having first and second faces and being coaxially disposed within the zone to be protected so as to be coaxially located at its first face with the tubing joint and coaxially located at its second face with the coupling, said third carbide ring having an outside diameter approximately equal to the outside diameter of the impact distribution ring and an expanded inside diameter, said expanded inside diameter being sufficient to accommodate the increased diameter of the coupling and said third carbide ring being engagable on its first face with the second face of the impact distribution ring and on its second face with the first face of a second carbide ring; and biasing means coaxially located along the tool joint, said biasing means being engagable at one end with a retainer coaxially located on the tubing joint and at the other end with at least one of the first protective carbide rings to thereby bias the first and second carbide rings, the transition ring, the impact distribution ring and the third ring against a second retainer locatable on the tubular to thereby sealingly engage said rings to form a protective shield over a portion of the tubing joint and the coupling.

* * * * *